United States Patent
Du Bois

[15] 3,648,397
[45] Mar. 14, 1972

[54] FISHING LURE

[72] Inventor: Donald Du Bois, 6627 North Washington Blvd., Arlington, Va. 22205

[22] Filed: Feb. 16, 1970

[21] Appl. No.: 11,815

[52] U.S. Cl. ..................................43/42.12, 43/42.19
[51] Int. Cl. ..................................................A01k 85/00
[58] Field of Search ...............43/42.12, 42.14, 42.16, 42.17, 43/42.19

[56] References Cited

UNITED STATES PATENTS 3,466,786  9/1969  Lewis...................................43/42.17

*Primary Examiner*—Melvin D. Rein
*Attorney*—Mason, Fenwick & Lawrence

[57] ABSTRACT

A fishing lure which includes a rotatable element secured to the member by which it is attached to a fishing line by passage of the attaching member through a control slot formed in the rotatable element. The control slot has seats at its ends on opposite sides of the center of the rotatable element in which the attaching means rests. In a preferred form, the rotatable element is mounted on a shaft having means for attachment to the line, the shaft having a pivotal connection to the rotatable element spaced longitudinally of the member from the control slot. The rotatable element cants to one side or the other of the shaft depending upon which slot seat is engaged. Opposite rotation results from shifting from one seat to the other.

7 Claims, 12 Drawing Figures

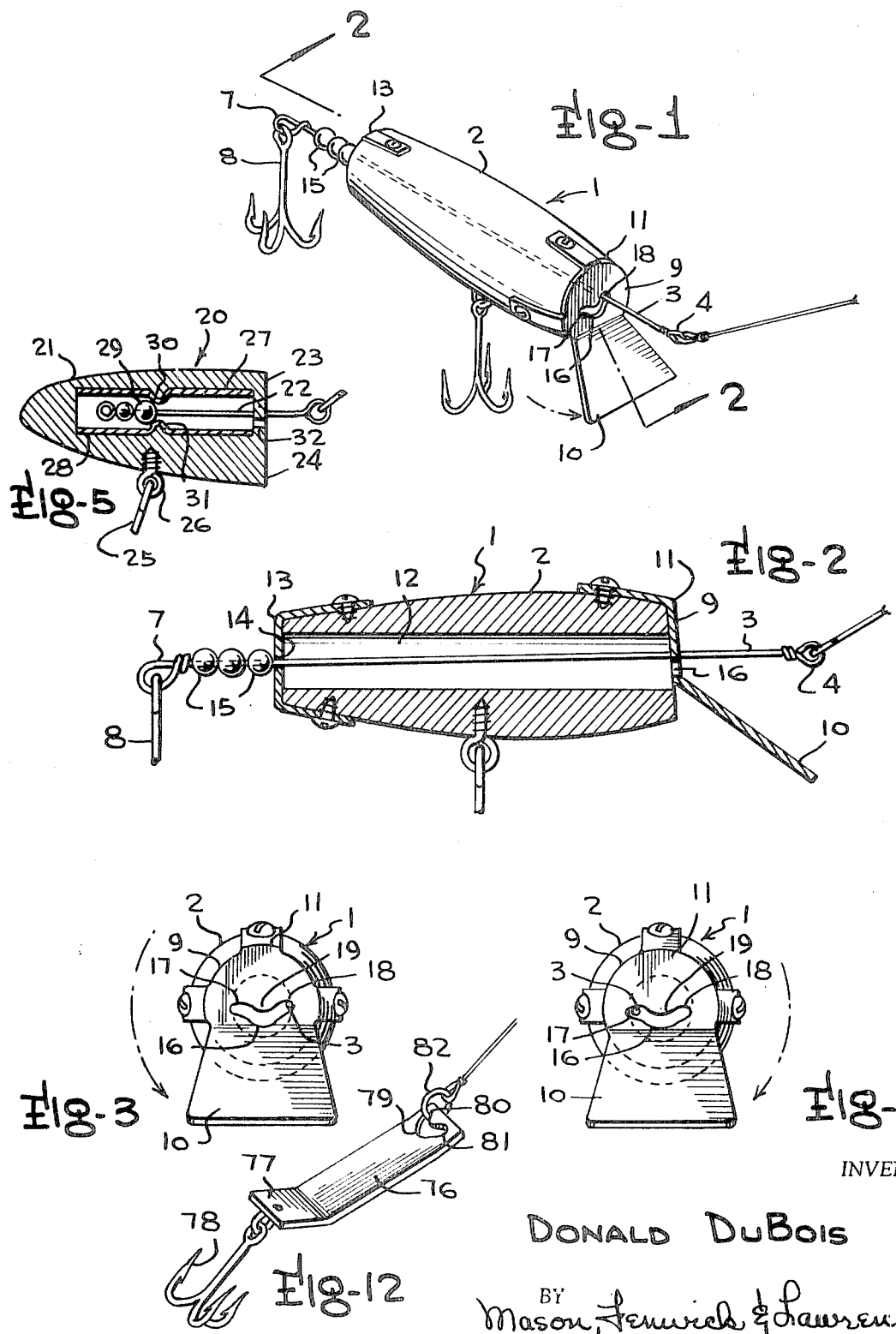

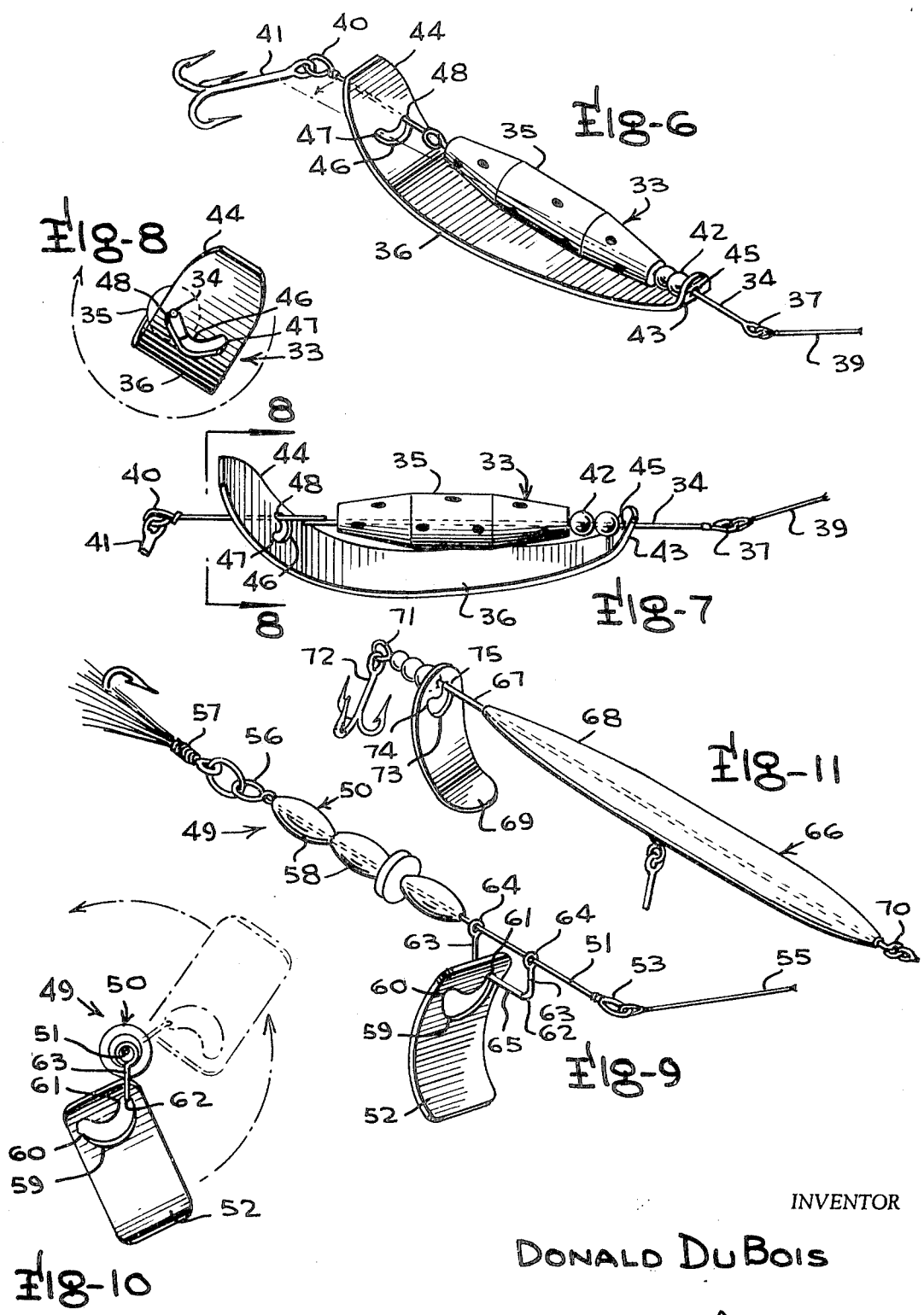

FISHING LURE

BACKGROUND OF THE INVENTION

This invention relates to fishing lures, and more particularly to improvements in fishing lures for use with fly-casting, bait casting, spinning and jigging rods of the general class which includes spinners, poppers, plugs, etc.

Hundreds of lures of various shapes, sizes and designs have been proposed in a continuous attempt to make a lure which will simulate the movements of live water creatures on which fish feed. Other efforts have been expended in creating lures which have unusual actions in the water, such as diving, spinning, darting from side to side, popping along the surface, or combinations of these, all in an attempt by lifelike movements, water agitation, or in other ways, to attract the attention of fish to the lure which carries one or more hooks.

It has been found that a spinning action is very effective, as its rapid rotation churns up the water as the lure is drawn through it, and the rotating metal of which the spinner is usually made, causes light reflections which attract attention. Most spinners can rotate either way, but there is no control of direction, so they may rotate in one direction most, or all, of the time. Various means, such as swivels and keels, are used to attempt to overcome this. Propellers, of course, always spin in one direction. Because of the tendency of conventional spinners to spin in one direction, most, or all, of the time, they continually twist the line in one direction, causing it to kink and tangle. Further, as movement through the air of a normal spinner causes almost no drag or air resistance, a spinner hits the end of the line with a jolt on both the back and forward cast when used with a fly rod. This is not only aggravating to the fisherman, but, because of the slack put in the line by the jolt, the fisherman may lose control of the spinner and it may strike him with the danger of its hooks becoming embedded in him. Propeller spinners are not suitable for use with fly rods, because their resistance to the water on pick up for the back cast puts too much stress on the rod tip. A normal spinner's rotation has little effect upon the overall lure action if the spinner is added to a lure of another kind. The total result is the separate action of the two members.

SUMMARY OF THE INVENTION

The principal object of the present invention is to provide a lure having at least in part, a spinning action made possible through a novel means for attachment of the rotatable means to the line or as a part of the lure in turn connected to the line.

A more specific object of the invention is to provide a lure in which the spinning member is connected to the means by which it is drawn through the water by means including a generally crescent-shaped opening having spaced rotational seats, into either of which the attaching member may fall.

Another object is the provision of a fishing lure of this type having the means for attachment pivoted to the lure at a point spaced in the direction of lure movement through the water from the opening which controls spinning action and through which the means for attachment passes.

A further object is to provide a lure which has a spinning action, and is capable of reversing its direction of rotation during movement through the water to cause unusual action of the lure.

Still another object of the invention is to provide a lure which has an unpredictable spinning action, which may result in one direction spinning for a time, then a reversal of direction.

A further object is the provision of a lure which by chance may be clockwise half the time during movement through the water and counterclockwise half the time, whereby twist put in the line by one direction of rotation will be taken out by a reversal of direction.

Yet another object is to provide a lure than when used in fly rod fishing will cause very little water resistance on pick up for the back cast.

It is also an object to provide a lure which will begin its spinning movement during casting, and creates sufficient air resistance to insure that the lure comes smoothly to the end of the back and forward casts without line jolt, so that the lure is under control at all times and is not dangerous to the fisherman.

Other objects of the invention will become apparent from the following description of several practical embodiments thereof, when taken in conjunction with the drawings which accompany, and form part of, this specification.

BRIEF DESCRIPTION OF THE DRAWINGS

FIG. 1 is a perspective view of a plug type lure embodying the principles of the present invention;

FIG. 2 is a longitudinal section through the lure, taken on the line 2—2 of FIG. 1;

FIG. 3 is a front elevation of the lure showing the attitude of the lure and its direction of rotation when the line attaching means is at one end of the spin control slot;

FIG. 4 is a view similar to FIG. 3 illustrating the attitude of the lure and the spin direction when the attaching means is at the other end of the spin control slot;

FIG. 5 is a longitudinal section through another type of lure which has the pivot point within the lure body, instead of at the back end of the body as shown in FIGS. 1 through 4;

FIG. 6 is a perspective view of another lure having a spinning member rotatable around the body;

FIG. 7 is a side elevation of the lure shown in FIG. 6;

FIG. 8 is a section taken on the line 8—8 of FIG. 7, illustrating the end of the lure;

FIG. 9 is a perspective view of a further modified lure wherein the spinner rotates around the attaching member;

FIG. 10 is an end view of the lure shown in FIG. 9;

FIG. 11 is a perspective view of a further embodiment of the spinning principle disclosed; and FIG. 12 is a perspective view of a still further type of lure employing the disclosed concept.

DESCRIPTION OF THE PREFERRED EMBODIMENT

In general, the invention resides in a lure which, in whole or in part, is adapted to spin about an axis which is the line, or provided for attachment to the leader, or line, which is to be used to draw the lure through the water. Included in the mounting means for the spinning element is an opening, or spin control slot, which can be straight, but is usually of modified U, or V, shape, having spaced ends, normally separated by a rise, and into which the line attaching means rests in alternation, providing opposed rotation seats at the ends of the slot to control the direction of rotation.

Referring to the drawings in detail, and first to that form of the invention shown in FIGS. 1 through 4, the lure 1 includes a body 2, rotatably mounted upon a shaft 3 having an eye 4 for attachment to a line 6 at one end, and an eye 7 for connection to a hook 8 at the other end. Shaft 3 is a wire rod, the eyes being formed by bending the wire ends.

The body 2 is a conventional plug type in general shape. It is circular in cross section with a curving taper from front to back. The front 9 is shown as flat with a forwardly and downwardly extending spin blade 10. The front face and spin blade may be molded integrally with the body and need not be flat, but could be concave about a vertical axis. It may be formed by a plate 11, as shown, attached to the body front end. The blade may be at the front as shown, or may be placed somewhat in back of the front face. Through the center of the body there is a cylindrical hole 12. In the form shown, plate 11 covers the front end of this hole, and a cap 13 covers the back end. Cap 13 has a shaft pivot opening 14 in its center, axially aligned with the hole 12. Opening 14 is somewhat larger than shaft 3, and the shaft carries one or more beads 15, the one adjacent the cap 13 seating in the cap opening 14 and providing a ball pivot for shaft 3 when the body back end is against the ball, as it will be when the lure is being drawn through the water. Plate 11 carries a spin control slot 16 through which shaft 3 passes. The position of shaft 3 in control slot 16 determines the action of the lure and the direction of rotation of the lure body 2 about shaft 3.

Control slot 16 is shown as V-shaped with the spaced ends of the V wings forming seats 17 and 18 for shaft 3 with a ridge 19 between them. It is not necessary that the slot be of V shape, but it is essential that two horizontally spaced, rotative seats be provided with one seat on each side of the centerline of the lure. Although a straight slot will work, and such a slot comes within the concept of the invention, there is the possibility that the attaching means might rest intermediate the spaced seats and no rotation would occur. However, with the slot edge forming the ridge, or rise, 19 between the seats, the shaft will ride off the ridge 19 into one or the other of the seats 17 and 18, and fixed, offcenter rotation points are established, even though it cannot be predetermined which seat the shaft will slip into, or how long it will remain in that seat as the lure is drawn through the water.

When the lure is first moved through the water, the body is free to shift about the shaft pivot 14, and will swing to one side or the other to cause either the seat 17 or the seat 18 to drop into shaft 3. It is unpredictable which way the body will shift. If the body comes to rest with the shaft in the seat 18, as shown in FIG. 3, the entire body will be canted to the left of the shaft axis, tilting the spin blade front face toward the left so that water pressure upon the face will cause the blade and body to spin in a counterclockwise direction, as shown by the arrow in FIG. 3. If the body comes to rest with the shaft 3 in seat 17, as shown in FIG. 4, the body is canted toward the right, which reverses the angle at which the spin blade is presented to the water, and the body will spin in a clockwise direction, as shown in FIG. 4.

As the lure is drawn through the water, the body may continue to spin in the direction it started, or it may reverse its direction. Water currents, sudden water or lure movement may cause the body to shift so that the shaft engages in the other seat, resulting in instant reversal of spin. The unpredictability of spin direction, as well as the sudden shifts and changes in spin direction, result in a most unusual effect in the water and serve to maintain a twist-free line.

The lure 20, shown in FIG. 5, is in many respects similar to that just described. It differs in that the body 21 is a one-piece molded member, and the attaching shaft 22 is pivotally attached within the body and does not extend completely through the body. This results in a much shorter pivot length for the attaching shaft, a greater deflection of the body in shifting from one position to the other, and a much more rapid spinning of the body about the shaft.

The body 21 can have any desired contour, but the front face 23 always includes a surface 24 below the control slot which is of greater area than that above. A hook 25 is attached to the body by any desired anchor 26. The body has a recess 27 from its front face 24, and a length of tubing 28 is molded into the recess. The tube carries the back end of shaft 22 on which an anchoring bead 29 is mounted. The tube 28 is depressed forwardly of bead 29, as at 30, to confine the bead and shaft within the tube, and to provide a shaft pivot opening 31. The body face at the outlet of the recess has a control slot 32, similar to the slot 16 of the lure previously described. As the slot is the same shape and the shaft coacts with it in the same manner, it has not been shown in detail and it needs no detailed description.

Turning now to that form of the invention shown in FIGS. 6, 7 and 8, a somewhat different type of lure is shown, but the principle of spin operation is the same. In this form, the lure 33 has an attaching shaft 34 on which is mounted a body 35 and a spinner 36. Shaft 34 has a front eye 37, for connection to line 39, and a back eye 40 for attaching a hook 41. The shaft carries the usual beads 42 between the body and the spinner 36.

The body 35 is an elongated member, tapering toward the ends. It may take any shape, and may be free on, or fixed to, the shaft. It has no functional movement relative to the shaft. It is not necessary to the spinning action of the lure, and simply serves as a colorful member on the shaft.

Spinner 36 is very similar in appearance to a conventional spoon. Its action, however, is quite different. The spinner is formed from a flat strip which may have an outline simulating the shape of a fish. It has a relatively narrow forward end 43, and a wider rear end 44. The entire strip is bowed from end to end, and provides an upturned mounting ear at the forward end 43, having a shaft pivot opening 45 through it. The upturned rear end 44 has a control slot 46 through which the shaft passes. Slot 46 is again of general V-shape, providing the shaft seats 47 and 48.

It is to be noted that the shaft pivot opening and the control slot are reversed in this form relative to those forms previously described. Here, the pivot opening is at the front of the spin member and the control slot is at the rear. The action is the same, however, insofar as canting of the spin member is concerned. Seating of the shaft in one or the other of the seats in the control slot causes the spinner to be canted and its face which is contacted by the water, to be tilted to cause rotation. The spinner is canted in opposite directions when the shaft moves from one seat to the other, and consequently, rotation of the spinner will be in opposite directions.

The lure shown in FIGS. 9 and 10 is different in construction from any of those described, for it employs a spinner connected at only one point to the line-attaching means, but it contains the same control slot and spins in accordance with the same principle as the lures already described.

The lure 49 of the FIG. 9 embodiment has what may be termed a body 50 mounted on a line-attaching shaft 51. A spinner 52 is carried by the shaft.

Shaft 51 has a forward eye 53 connected to a line 55. The back end of the shaft has an eye 56 for attachment of a hook 57 of desired type. The body 50 is composed of beads 58 strung along the shaft.

Spinner 52 is formed of a rectangular strip of material curved from end to end. Near one end, the strip has a substantially V-shaped control slot 59. The slot shown is not as pronounced a V-shape as the previous ones, but the outline of the slot is more rounded to provide a crescent shape. Nevertheless, the spaced seats 60 and 61 are provided. In this form, the shaft 51 does not pass directly through the control slot, but a shaft hanger 62, composed of spaced legs 63 having shaft-encircling loops 64 at their ends, are interconnected by a bar 65, supports the spinner for rotation about the shaft. The bar 65 of the hanger passes through the control slot of the spinner and moves into the control slot seats as the spinner shifts position. Pressure of the water as the lure moves through it causes the spinner to rotate about shaft 51. As the spinner shifts to seat the hanger bar 65 in opposite ends of the slot, the spinner is thrown off center to present a greater portion of its leading face on one side or the other of a vertical line through the center of support, to cause reverse directions of rotation. Here, again, the direction of rotation may change as the lure is moved through the water, and the direction of rotation and time of direction change are both unpredictable.

In FIG. 11, a modification of the single point of mount spinner is shown. In this form, the lure 66 is composed of an attaching shaft 67, a body 68 and a spinner 69. The spinner is at the back end of the body and mounted directly on shaft 67.

The shaft 67, as before, has a forward eye 70 for connection to the line, and a rear eye 71 for attaching a hook 72. Body 68 may take any desired shape, and the one shown is relatively long and thin, with tapering ends. It has no rotative movement relative to the shaft.

Spinner 69 is similar to the one in the immediately preceding form, and is simply a rectangular strip curved from end to end. Near one end, there is a control slot 73 of the same shape as those previously described, having the spaced seats 74 and 75. In this embodiment, the shaft 67 passes through the control slot, so that the shifting of the spinner from one side to the other throws the spinner off center relative to the attaching shaft. The action, insofar as spinning movement is concerned, is the same as before. It has been noted, however, that having the spinner behind the body causes the body to follow a somewhat wobbly path through the water, which is very like the movement of a swimming fish.

The last modification illustrated is shown in FIG. 12. This form of lure consists of a single length of strip material, having a substantially flat forward section 76, and an upturned rearward section forming a spin blade 77. A hook 78 is suitably connected to the spin blade. At the leading edge of the forward section of the lure, there is a spin control slot 79. It has the shape of those previously described, and includes the laterally spaced seats 80 and 81. An attaching member in the form of a ring 82 passes through the slot 79 and connects a line 84. The attaching member, as before, will fall into one or the other of the seats of the slot, causing the lure to swing off center and tilting of the spin blade 77 surface. Rotation will follow.

It will be noted that in all of the disclosed forms, the rotatable member, or spinner, whether it forms all or part of the lure, has an elongated, spin control slot with laterally spaced seats into which a wire or shaftlike element, forming part of the means attaching the rotatable member to the line, is adapted to seat. The control slot seats are on opposite sides of the longitudinal centerline of the rotatable member so that the rotatable member is canted to one side or the other when the attaching means is in one of the slot seats. This tilts the spin blade angle in opposite directions at small angles on either side of a plane normal to the direction of movement of the lure through the water, and the angle of tilt determines the direction of rotation. Also, the canting or offcenter movement of the rotatable member causes a greater area of the blade surface to lie on one side of a line projected downwardly from the axis of the engaged seat of the slot for greater water pressure on one side than the other to cause rotation. In the lures shown in FIGS. 1, 5, 6 and 11, the shaft is the attaching member on which the spinning element rotates. In FIG. 9, the hanger 62 supports the spinner directly, but it is connected to the shaft and forms part of the means attaching the spinner to the line. In FIG. 12, the ring 82 is the attaching means. Consequently, the same principle of operation is present in all of the disclosed forms.

While in the above several forms of the invention have been disclosed, the particular details of construction shown and described are merely by way of illustration, and the invention may take other forms within the scope of the appended claims.

I claim:

1. A fishing lure comprising, a shaft for attachment to a fishing line, a spinning element having a control slot therein near one end thereof through which the shaft freely passes, the control slot having two rotational seats therein spaced apart on opposite sides of the longitudinal centerline of the spinning element, means on the spinning element spaced longitudinally of the element from the control slot forming a fulcrum between the shaft and spinning element, whereby the spinning element may tilt about the fulcrum to move the control slot relative to the shaft and cause indiscriminate engagement of the shaft with one or the other of said rotational seats.

2. A fishing lure as claimed in claim 1, wherein the portion of the control slot between the seats is offset convexly from the seats.

3. A fishing lure as claimed in claim 1, wherein the spinning element is a longitudinally curved member having an opening adjacent one end through which the shaft passes to form said fulcrum and the control slot adjacent the other end.

4. A fishing lure as claimed in claim 3, wherein the free end of the spinning element containing the control slot extends at an angle to the shaft to provide a spin blade.

5. A fishing lure as claimed in claim 1, wherein the spinning element is an elongated body having an inclined spin blade adjacent one end, the control slot being in the body end adjacent the spin blade, and the fulcrum being carried by the body spaced from the end containing the control slot.

6. A fishing lure as claimed in claim 5, wherein the fulcrum is at the opposite end of the body from the control slot.

7. A fishing lure as claimed in claim 5, wherein the fulcrum is within the body intermediate the body ends.

* * * * *